(12) United States Patent
Yang et al.

(10) Patent No.: US 12,127,598 B2
(45) Date of Patent: Oct. 29, 2024

(54) AIRFLOW SENSOR AND ELECTRONIC CIGARETTE

(71) Applicant: SHENZHEN FIRST UNION TECHNOLOGY CO., LTD., Shenzhen (CN)

(72) Inventors: Jing Yang, Shenzhen (CN); Laihong Zhang, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 400 days.

(21) Appl. No.: 17/765,438

(22) PCT Filed: Sep. 25, 2020

(86) PCT No.: PCT/CN2020/117869
§ 371 (c)(1),
(2) Date: Mar. 30, 2022

(87) PCT Pub. No.: WO2021/063268
PCT Pub. Date: Apr. 8, 2021

(65) Prior Publication Data
US 2022/0361584 A1    Nov. 17, 2022

(30) Foreign Application Priority Data

Sep. 30, 2019   (CN) .......................... 201921653910.4

(51) Int. Cl.
*A24F 40/51*    (2020.01)
*A24F 40/10*    (2020.01)
(Continued)

(52) U.S. Cl.
CPC .............. *A24F 40/51* (2020.01); *A24F 40/10* (2020.01); *A24F 40/40* (2020.01); *G01F 1/56* (2013.01)

(58) Field of Classification Search
CPC .......... A24F 40/51; A24F 40/10; A24F 40/40; G01F 1/56
See application file for complete search history.

(56) References Cited

U.S. PATENT DOCUMENTS

2018/0164134 A1    6/2018  Zhong et al.
2019/0281892 A1*   9/2019  Hejazi .................... A24F 40/465
2020/0011756 A1*   1/2020  Ouyang ............. G01L 19/0654

FOREIGN PATENT DOCUMENTS

CN      102783714 A     11/2012
CN      203799956 U      8/2014
(Continued)

*Primary Examiner* — Catherine T. Rastovski
*Assistant Examiner* — Drexel Alejandro Venero
(74) *Attorney, Agent, or Firm* — Cheng-Ju Chiang

(57) ABSTRACT

An airflow sensor includes a sensing circuit module having a circuit board and a sensing component, a first sealing piece and a second sealing piece. The first sealing piece is disposed to cover at least a part of a first surface of the circuit board. The second sealing piece is disposed to cover at least a part of a second surface opposite to the first surface. A first accommodating cavity is formed between the first sealing piece and the circuit board. The sensing component is received in the first accommodating cavity. The first sealing piece includes a first waterproof air-permeable portion. A connecting soldering pad electrically connected with the sensing component is disposed at the circuit board. The airflow sensor is electrically connected with other circuitry components through the connecting soldering pad. The connecting soldering pad is not covered by either the first sealing piece or the second sealing piece.

14 Claims, 5 Drawing Sheets

(51) Int. Cl.
    *A24F 40/40*     (2020.01)
    *G01F 1/56*      (2006.01)

(56)         References Cited

FOREIGN PATENT DOCUMENTS

| CN | 104605483 A  | 5/2015  |
| CN | 105455195 A  | 4/2016  |
| CN | 108420125 A  | 8/2018  |
| CN | 208676373 U  | 4/2019  |
| CN | 209300274 U  | 8/2019  |
| CN | 110507007 A  | 11/2019 |
| CN | 211065067 U  | 7/2020  |

\* cited by examiner

AIRFLOW SENSOR AND ELECTRONIC CIGARETTE

CROSS REFERENCE TO RELATED APPLICATIONS

The present invention is a 35 U.S.C. § 371 National Phase conversion of International (PCT) Patent Application No. PCT/CN2020/117869, filed on Sep. 25, 2020, which claims benefit of Chinese Application No. 201921653910.4, filed in Chinese Patent Office on Sep. 30, 2019 and entitled as "Airflow Sensor and Electronic Cigarette", the disclosure of which is incorporated by reference herein. The PCT International Patent Application was filed and published in Chinese.

FIELD OF THE INVENTION

The present invention relates to a technical field of electronics, particularly relates to an airflow sensor and an electronic cigarette having the airflow sensor.

DESCRIPTION OF BACKGROUND RELATED ART

An electronic cigarette usually includes a battery assembly and an atomizing assembly. An air flow sensor used to control working of the electronic cigarette is disposed in the battery assembly. The air flow sensor is able to initiate a heating wire in the atomizing assembly to heat and atomize tobacco liquid. Aerosols are generated by atomizing the tobacco liquid for users to inhale. In an existing electronic cigarette, an air channel of the air flow sensor for triggering is usually designed to share the same air path as an inlet channel of the atomizing assembly. A user inhales at a sucking nozzle of the atomizing assembly when the user smokes. The air flow sensor is then triggered to be initiated for starting the atomizing assembly to work. The heating wire in the atomizing assembly works to generate a high temperature so that the tobacco liquid is atomized to generate aerosols. Since a temperature of the aerosols is higher than a temperature of a body of the atomizing assembly, condensate tobacco liquid will be formed. The condensate tobacco liquid and leaking tobacco liquid in the electronic cigarette usually flow into the air flow sensor through the inlet channel. As a result, the air flow sensor is caused to be out of work, and a using life of the electronic cigarette is reduced. In order to solve the above technical problem, technical personnel in the related art usually design to add a sealing structure between the air flow sensor and the atomizing assembly in order to lower possibility of the condensate tobacco liquid and the leaking tobacco liquid flowing into the air flow sensor. However, a sealing effect of the sealing structure is still worse. Liquid such as water and tobacco liquid, etc., is still able to flow into the air flow sensor through the inlet of the electronic cigarette.

BRIEF SUMMARY OF THE INVENTION

The present invention is provided to solve a technical problem by overcoming deficiency of the existing technology, and to provide an airflow sensor and an electronic cigarette that are designed to better prevent liquid such as water and tobacco liquid, etc., from entering the airflow sensor.

In order to solve the aforementioned technical problem, an airflow sensor in accordance with the present invention is provided. The airflow sensor includes a sensing circuit module, a first sealing piece and a second sealing piece. The sensing circuit module includes a circuit board and a sensing component disposed on the circuit board. The circuit board includes a first surface and a second surface disposed at two opposite sides of the circuit board. The first sealing piece is disposed to cover at least a part of the first surface. The second sealing piece is disposed to cover at least a part of the second surface. A first accommodating cavity is defined and formed between the first sealing piece and the circuit board. The sensing component is received in the first accommodating cavity. The first sealing piece includes a first waterproof air-permeable portion. The first waterproof air-permeable portion is used to form airflow communication between the first accommodating cavity and an outside of the airflow sensor, and to prevent liquid outside the airflow sensor from entering the first accommodating cavity. A connecting soldering pad electrically connected with the sensing component is disposed at the circuit board. The airflow sensor is electrically connected with other circuitry components through the connecting soldering pad. The connecting soldering pad is not covered by either the first sealing piece or the second sealing piece.

Preferably, an air vent is opened and disposed at the circuit board to penetrate through the circuit board from the first surface to the second surface. The second sealing piece is disposed to cover the air vent. Besides, the second sealing piece includes a second waterproof air-permeable portion. The second waterproof air-permeable portion is used to form airflow communication between the air vent and the outside of the airflow sensor, and to prevent liquid outside the airflow sensor from entering the air vent.

Preferably, the connecting soldering pad is disposed at the first surface.

Preferably, a connecting circuit is disposed inside the circuit board. The sensing component is electrically connected with the connecting soldering pad through the connecting circuit.

Preferably, the first sealing piece includes a first cover body and a first waterproof air-permeable membrane. The first cover body is disposed to cover the first surface. The first accommodating cavity is defined and formed between the first cover body and the circuit board. An air outlet is disposed at the first cover body. The first waterproof air-permeable membrane is connected with the first cover body and covers the air outlet. The first waterproof air-permeable portion is formed by a part of the first waterproof air-permeable membrane covering the air outlet.

Preferably, a first sealing pad is disposed at the first surface. The first cover body is soldered and connected on the first sealing pad.

Preferably, the sensing component includes a signal processing chip, a slip ring and a sensing capacitor all of which are disposed in the first accommodating cavity. The sensing capacitor includes an electric conductive film and an electrode plate. An end of the slip ring is fixed on the circuit board and is electrically connected with the signal processing chip. The electric conductive film is disposed to cover an end face of another end of the slip ring. The slip ring and the electric conductive film are formed as an air blocking and isolating cover. A vent exit of the air vent located on the first surface is covered by the air blocking and isolating cover. The electrode plate and the electric conductive film are disposed to be spaced from each other, and the electrode plate is electrically connected with the signal processing chip.

Preferably, an outer circumferential face of the electrode plate and an inner wall face of the first cover body are interference fit, and the electrode plate is electrically connected with the signal processing chip through the first cover body.

Preferably, the second sealing piece includes a second cover body and a second waterproof air-permeable membrane. The second cover body is disposed to cover the second surface. A second accommodating cavity is defined and formed between the second cover body and the circuit board. An air inlet is disposed at the second cover body. The second waterproof air-permeable membrane is connected with the second cover body, and covers the air inlet. The second waterproof air-permeable portion is formed by a portion of the second waterproof air-permeable membrane covering the air inlet.

Preferably, a second sealing pad is disposed at the second surface. The second cover body is soldered and connected with the second sealing pad.

Preferably, the second sealing pad is ring shaped. The second cover body includes a cylindrical lateral wall and a ring-shaped end wall. The lateral wall includes a first end and a second end opposite disposed on the lateral wall. An end face of the first end of the lateral wall is soldered and connected with the second sealing pad. An end face of the second end of the lateral wall is connected with the end wall. The end wall and the lateral wall are an integrally formed structure. The air inlet is formed at a middle of the end wall. A first adhering layer is disposed between the end wall and the second waterproof air-permeable membrane to surround the air inlet. The second waterproof air-permeable membrane is adhered and connected with the second cover body through the first adhering layer.

Preferably, the second sealing piece is a plate structure. The second sealing piece is adhered and connected with the circuit board.

The present invention further provides an electronic cigarette. The electronic cigarette includes an airflow sensor. The airflow sensor is the above described airflow sensor.

Advantages of the present invention is as follows. First of all, the airflow sensor in accordance with the present invention includes the first sealing piece and the second sealing piece. The first sealing piece is disposed to cover the first surface. The first accommodating cavity is defined and formed between the first sealing piece and the circuit board. The sensing component is received in the first accommodating cavity. The first sealing piece includes a first waterproof air-permeable portion. The second sealing piece is disposed to cover the second surface. Hence, liquid such as water or tobacco liquid, etc., is prevented and blocked outside the airflow sensor by the first waterproof air-permeable portion and the second waterproof air-permeable portion. Liquid such as water or tobacco liquid, etc., inside and outside the electronic cigarette cannot completely flow into the airflow sensor. As a result, a using life of the electronic cigarette is elongated. Secondly, since the first sealing piece and the second sealing piece are respectively disposed to cover corresponding locations of the first surface and the second surface, the airflow sensor and the electronic cigarette in accordance with the present invention is convenient for manufacture, and have better hermeticity. Finally, since the connecting soldering pad electrically connected with the sensing component is disposed at the circuit board, the airflow sensor is electrically connected with other circuitry components through the connecting soldering pad. The connecting soldering pad is not covered by either the first sealing piece or the second sealing piece. Hence, a problem of bad hermeticity caused by opening holes on the first sealing piece or the second sealing piece can be avoided.

BRIEF DESCRIPTION OF THE DRAWINGS

One or more embodiments in accordance with the present invention are illustratively exemplified for explanation through figures shown in the corresponding attached drawings. These exemplified descriptions do not constitute any limitation on the embodiments. The elements with the same reference numerals in the attached drawings are denoted as similar elements. Unless otherwise stated, the figures in the attached drawings do not constitute any scale limitation.

DETAILED DESCRIPTION OF THE INVENTION

Structures and principles of an airflow sensor and an electronic cigarette in accordance with the present invention will be illustrated in more detail below in conjunction with preferred embodiments as shown below.

Embodiment 1

Figure 1:
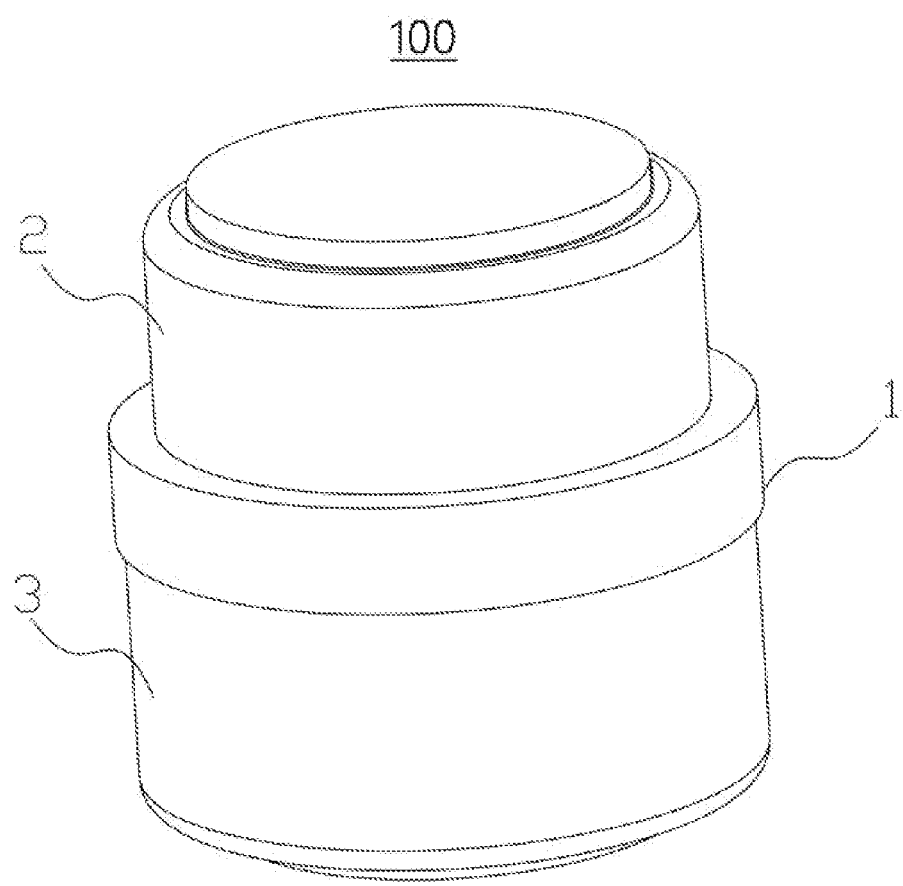
FIG. 1 shows a schematic structural perspective view of an airflow sensor in accordance with a first preferred embodiment of the present invention.
Figure 2:
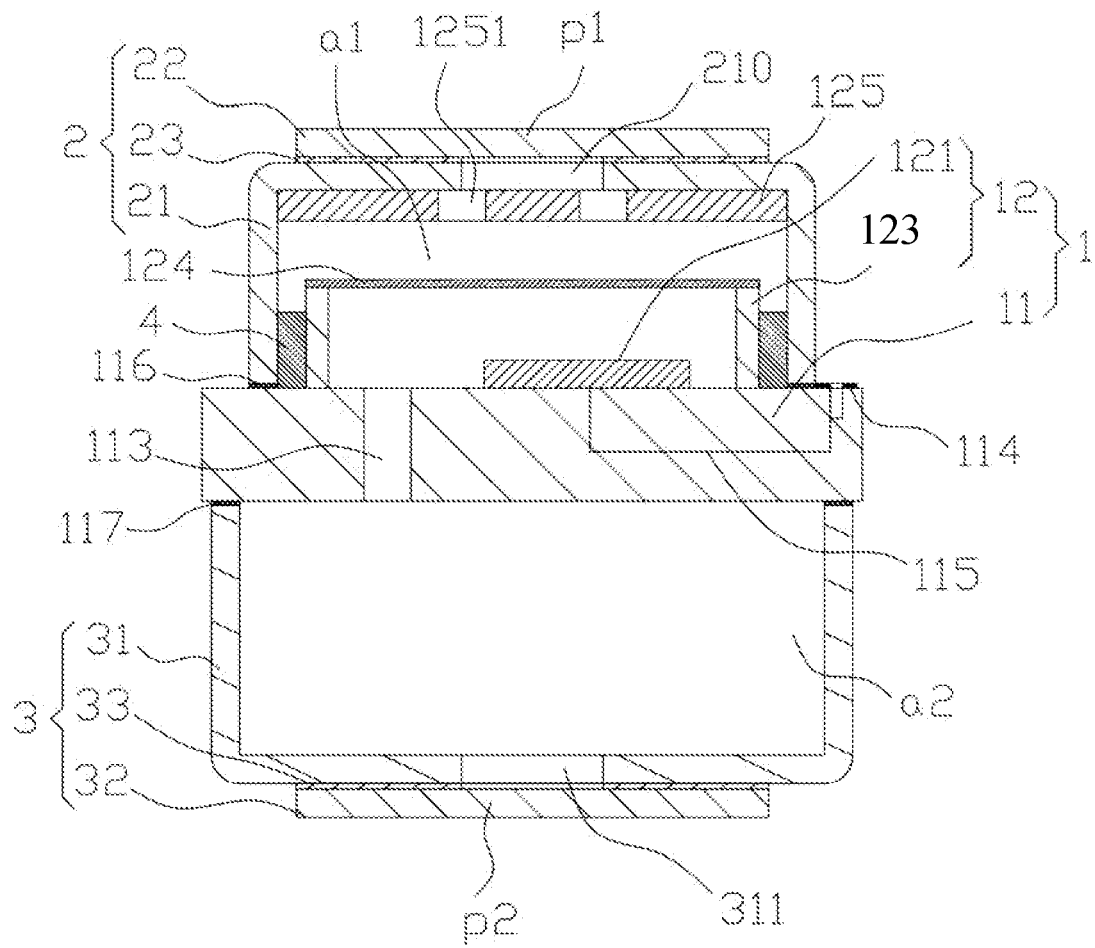
FIG. 2 shows a schematic cross sectional view of the airflow sensor shown in FIG. 1 in accordance with the first preferred embodiment of the present invention.
Figure 3:
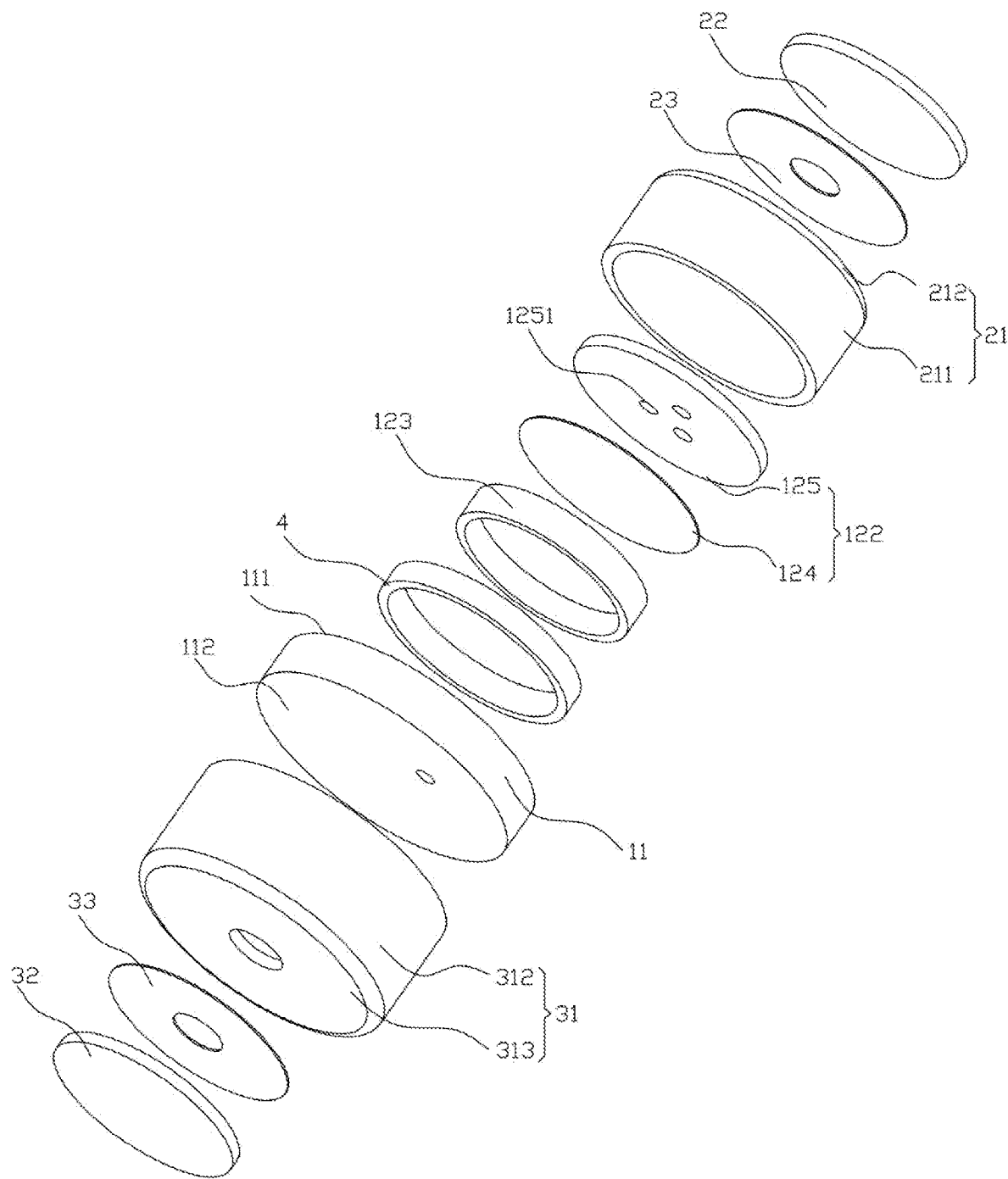
FIG. 3 shows a schematic exploded perspective view of the airflow sensor shown in FIG. 1 in accordance with the first preferred embodiment of the present invention.

Referring to FIGS. 1-3, an airflow sensor 100 in accordance with the present invention includes a sensing circuit module 1, a first sealing piece 2 and a second sealing piece 3. The sensing circuit module 1 includes a circuit board 11 and a sensing component 12 disposed on the circuit board 11. A physical structure of the sensing component 12 can be disposed according to requirements as long as the sensing component 12 is able to sense airflows. The structure of the sensing component 12 is not specifically limited herein. In a preferred embodiment of the present invention, the sensing component 12 includes a signal processing chip 121, a sensing capacitor 122 and a slip ring 123. The sensing capacitor 122 includes an electric conductive film 124 and an electrode plate 125. An end of the slip ring 123 is fixed on the circuit board 11 and is electrically connected with the signal processing chip 121. The electric conductive film 124 is disposed to cover an end face of another end of the slip ring 123. The slip ring 123 and the electric conductive film 124 are formed as an air blocking and isolating cover. The electrode plate 125 and the electric conductive film 124 are disposed to be spaced from each other, and the electrode plate 125 is electrically connected with the signal processing chip 121. In particular, the electrode plate 125 and the electric conductive film 124 are parallel to each other. Airflow through holes 1251 are formed at the electrode plate 125. Understandably, a certain angle can be formed between the electrode plate 125 and the electric conductive film 124 as long as a capacitor can be formed between the electrode plate 125 and the electric conductive film 124. A structure of the electrode plate 125 and the electric conductive film 124 is not physically limited herein.

The circuit board 11 includes a first surface 111 and a second surface 112 disposed at two opposite sides of the circuit board 11. An air vent 113 is disposed at the circuit board 11 to penetrate through the circuit board 11 from the first surface 111 to the second surface 112. An orthogonal projection of the electric conductive film 124 on the circuit board 11 is overlapped with an exit of the air vent 113. In order to better avoid contact between the slip ring 123 and the first sealing piece 2, an insulative ring 4 is disposed to surround around an outer circumferential face of the slip ring 123.

The first sealing piece 2 is disposed to cover the first surface 111, and a first accommodating cavity a1 is formed between the first sealing piece 2 and the first surface 111. The sensing component 12 is received in the first accommodating cavity a1. In particular, the signal processing chip 121, the sensing capacitor 122 and the slip ring 123 are all disposed in the first accommodating cavity a1. A vent exit of the air vent 113 located on the first surface 111 is covered by the air blocking and isolating cover. A space formed between the air blocking and isolating cover and the circuit board 11 and an inner space of the first accommodating cavity a1 are spatially isolated from each other. In other words, spaces at two opposite sides of the electric conductive film 124 are spatially isolated from each other, and each of the spaces is not spatially communicated with another of the spaces to allow air in the each of the spaces to flow into the another of the spaces.

A connecting soldering pad 114 electrically connected with the sensing component 12 is disposed at the circuit board 11. The airflow sensor 100 is electrically connected with other circuitry components through the connecting soldering pad 114. The connecting soldering pad 114 is not covered by either the first sealing piece 2 or the second sealing piece 3. In particular, the connecting soldering pad 114 is disposed at the first surface 111 of the circuit board 11. The connecting soldering pad 114 is disposed outside the first accommodating cavity a1. The sensing component 12 is electrically connected with the connecting soldering pad 114 in order to be electrically connected with other components through the connecting soldering pad 114, or through wires soldered on the connecting soldering pad 114. Hence, the present invention is designed for being used conveniently. The problem of the existing technology that wires are prone to being broken and cracked because the wires are required to be bent toward the first surface 111 when the connecting soldering pad 114 is disposed on the second surface 112 can be avoided.

A connecting circuit 115 is disposed inside the circuit board 11. In other words, the connecting circuit 115 is embedded inside the circuit board 11. The sensing component 12 is electrically connected with the connecting soldering pad 114 through the connecting circuit 115. Hence, the first sealing piece 2 is not required to be equipped with any hole for the connecting circuit 115 passing therethrough. As a result, sealing and airtightness of the first accommodating cavity a1 can be better ensured to avoid flowing of liquid such as water and tobacco liquid, etc., into the first accommodating cavity a1.

A first waterproof air-permeable portion p1 is disposed in the first sealing piece 2. The first waterproof air-permeable portion p1 is used to form airflow communication between the first accommodating cavity a1 and an outside of the airflow sensor 100, and to prevent liquid outside the airflow sensor 100 from entering the first accommodating cavity a1. In particular, the first accommodating cavity a1 is spatially communicated with the outside of the airflow sensor 100 through the airflow through holes 1251 and the first waterproof air-permeable portion p1. Air in the first accommodating cavity a1 can flow out through the first waterproof air-permeable portion p1. Besides, liquid such as water and tobacco liquid, etc., is blocked and prevented by the first waterproof air-permeable portion p1 from flowing into the first accommodating cavity a1 so that the sensing component 12 located in the first accommodating cavity a1 can be protected.

Understandably, all elements of the sensing component 12 can be installed in the first accommodating cavity a1. Alternatively, only a part of the elements of the sensing component 12 is installed in the first accommodating cavity a1. In practical applications, only a part of the elements of the sensing component 12 which is much easily affected by liquid such as water and tobacco liquid, etc., is installed in the first accommodating cavity a1. The rest part of the elements of the sensing component 12 is disposed outside the first accommodating cavity a1.

In a preferred embodiment of the present invention, the first sealing piece 2 includes a first cover body 21 and a first waterproof air-permeable membrane 22. The first cover body 21 is disposed to cover the first surface 111, and is electrically connected with the circuit board 11. The first accommodating cavity a1 is defined and formed between the first cover body 21 and the circuit board 11. An air outlet 210 is disposed at the first cover body 21. The first waterproof air-permeable membrane 22 is connected with the first cover body 21 and covers the air outlet 210. The first waterproof air-permeable portion p1 is formed by a part of the first waterproof air-permeable membrane 22 covering the air outlet 210. Through match of the first cover body 21 and the first waterproof air-permeable membrane 22, the first sealing piece 2 is not only convenient to be installed and fixed but also has good hermeticity so that liquid such as water and tobacco liquid, etc., is not easy to flow into the first accommodating cavity a1. An outer circumferential face of the electrode plate 125 and an inner wall face of the first cover body 21 are interference fit, and the electrode plate 125 is electrically connected with the signal processing chip 121 through the first cover body 21. Hence, no additional wires are required to be used for electrical connection between the electrode plate 125 and the first cover body 21. As a result, the above described structure of the present invention is simple and compact, and is more convenient for manufacture.

In order to enhance liability of connection and further enhance sealing function, a first sealing pad 116 is disposed at the first surface 111. The first cover body 21 is soldered and connected on the first sealing pad 116. In particular, the first sealing pad 116 is ring-shaped. The first cover body 21 includes a cylindrical connecting part 211 and a ring-shaped end cover part 212. The connecting part 211 includes two ends opposite disposed on the connecting part 211. An end face of one of the two ends of the connecting part 211 is soldered and connected with the first sealing pad 116, and an end face of the other of the two ends of the connecting part 211 is connected with the end cover part 212. The end cover part 212 and the connecting part 211 are an integrally formed structure. The air outlet 210 is formed at a middle of the end cover part 212. A second adhering layer 23 is disposed between the end cover part 212 and the first waterproof air-permeable membrane 22 to surround the air outlet 210. In other words, the second adhering layer 23 is ring-shaped.

The first waterproof air-permeable membrane 22 is adhesively connected with the first cover body 21 through the second adhering layer 23.

In a preferred embodiment of the present invention, the first sealing piece 2 can be spherical dome shaped, and be adhesively connected with the circuit board 11. The first sealing piece 2 is made from a waterproof air-permeable material in order to ensure reliability of a structure of the first sealing piece 2. The waterproof air-permeable material can be high molecular weight polyethylene or polytetrafluoroethylene, etc. As long as the first sealing piece 2 can be used to perform function of waterproof and air-permeability, the material of the first sealing piece 2 is not physically limited herein. Understandably, a shape and material of the first sealing piece 2 is not physically limited herein as long as the first sealing piece 2 can be used to perform function of waterproof and air-permeability.

The second sealing piece 3 is disposed to cover the second surface 112, and to cover the air vent 113. Understandably, the first sealing piece 2 is disposed to cover at least a part of the first surface 111. The second sealing piece 3 is disposed to cover at least a part of the second surface 112. A size of a covering area of either the first sealing piece 2 or the second sealing piece 3 is not physically limited herein. A second waterproof air-permeable portion p2 is disposed at the second sealing piece 3. The second waterproof air-permeable portion p2 is used to form airflow communication between the air vent 113 and the outside of the airflow sensor 100, and to prevent liquid outside the airflow sensor 100 from entering the air vent 113.

The second sealing piece 3 includes a second cover body 31 and a second waterproof air-permeable membrane 32. The second cover body 31 is disposed to cover the second surface 112. A second accommodating cavity a2 is defined and formed between the second cover body 31 and the circuit board 11. An air inlet 311 is disposed at the second cover body 31. The air inlet 311 is spatially communicated with the second accommodating cavity a2. The second waterproof air-permeable membrane 32 is connected with the second cover body 31, and covers the air inlet 311. The second waterproof air-permeable portion p2 is formed by a portion of the second waterproof air-permeable membrane 32 covering the air inlet 311. As a result, water or tobacco liquid is prevented from flowing into the airflow sensor 100 through the air inlet 311.

In order to enhance liability of connection and further enhance sealing function, a second sealing pad 117 is disposed at the second surface 112. The second cover body 31 is soldered and connected with the second sealing pad 117. In particular, the second sealing pad 117 is ring shaped. The second cover body 31 includes a cylindrical lateral wall 312 and a ring-shaped end wall 313. The lateral wall 312 includes a first end and a second end opposite disposed on the lateral wall 312. An end face of the first end of the lateral wall 312 is soldered and connected with the second sealing pad 117. An end face of the second end of the lateral wall 312 is connected with the end wall 313. The end wall 313 and the lateral wall 312 are an integrally formed structure. The air inlet 311 is formed at a middle of the end wall 313. A first adhering layer 33 is disposed between the end wall 313 and the second waterproof air-permeable membrane 32 to surround the air inlet 311. The second waterproof air-permeable membrane 32 is adhered and connected with the second cover body 31 through the first adhering layer 33. Hence, the above described structure is not only steadily connected, but also convenient for production. In a preferred embodiment of the present invention, the first cover body 21 and the second cover body 31 are both a metal piece, and therefore are convenient for soldering.

Embodiment 2

Figure 4:
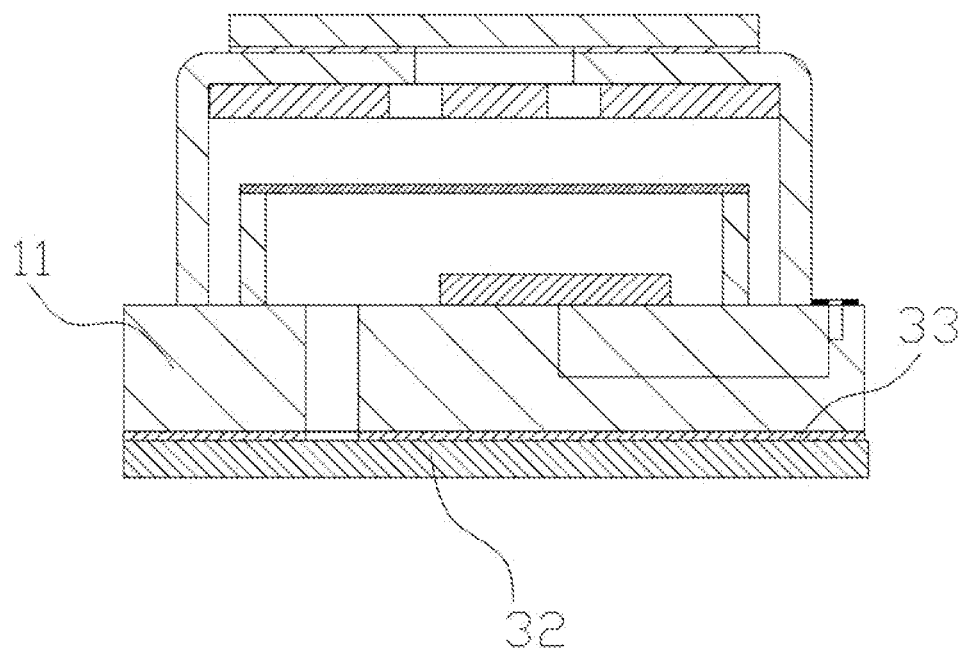
FIG. 4 shows a schematic structural cross sectional view of an airflow sensor in accordance with a second preferred embodiment of the present invention.

Referring to FIG. 4, a structure of a second preferred embodiment in accordance with the present invention is similar to a structure of a first preferred embodiment of the present invention described in Embodiment 1. Difference between the first and second preferred embodiments is as follows. A second sealing piece 3 in accordance with the second preferred embodiment of the present invention is a plate structure. The second sealing piece 3 is adhered and connected with the circuit board 11. In particular, the second sealing piece 3 in accordance with the second preferred embodiment of the present invention is unnecessary to be equipped with a second cover body 31 as described in the first preferred embodiment of the present invention. A first adhering layer 33 of the second sealing piece 3 is directly adhered and connected with the circuit board 11 in order to adhere and connect a second waterproof air-permeable membrane 32 of the second sealing piece 3 with the circuit board 11. Hence, a volume of the airflow sensor 100 can be reduced.

Embodiment 3

Figure 5:
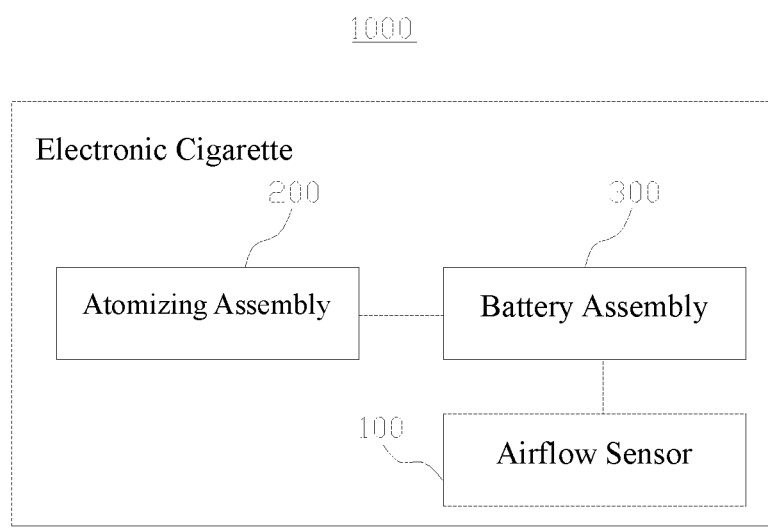
FIG. 5 shows a schematic structural principle diagram of an electronic cigarette in accordance with a third preferred embodiment of the present invention.

Referring to FIG. 5, an electronic cigarette 1000 is further provided in accordance with the present invention in order to atomize tobacco liquid for forming aerosols. The electronic cigarette 1000 includes the airflow sensor 100, an atomizing assembly 200 and a battery assembly 300. The airflow sensor 100 is electrically connected with the battery assembly 300 and the atomizing assembly 200 in order to control the battery assembly 300 for powering the atomizing assembly 200. The atomizing assembly 200 and the battery assembly 300 are designed to adopt existing technology, their structures are not further repeated herein. The airflow sensor 100 is the airflow sensor 100 described in the first preferred embodiment or the second preferred embodiment. Since a structure of the airflow sensor 100 in accordance with the preferred embodiment of the present invention is same as a structure of the airflow sensor 100 described in the first preferred embodiment or the second preferred embodiment, the structure of the airflow sensor 100 of the preferred embodiment is not herein further repeated.

When a user smokes, a negative pressure is generated inside the electronic cigarette 1000. Air inside the first accommodating cavity a1 flows out from the airflow sensor 100 through the airflow through holes 1251, the air outlet 210 and the first waterproof air-permeable portion p1. As a result, the electric conductive film 124 is deformed, and a scale of a capacitance of the sensing capacitor 122 is therefore changed. The signal processing chip 121 controls work of the electronic cigarette 1000 based on change of the capacitance in order to generate aerosols. The air vent 113 is disposed in the airflow sensor 100, and the air vent 113 is spatially communicated with the outside of the airflow sensor 100 through second waterproof air-permeable portion p2. Hence, when the airflow sensor 100 is in a non-smoking status, air pressures at two opposite sides of the electric conductive film 124 are kept in balance. Sensitivity of the airflow sensor 100 can therefore be enhanced when the user smokes.

In summary, first of all, the airflow sensor 100 in accordance with the present invention includes the first sealing piece 2 and the second sealing piece 3. The first sealing piece 2 is disposed to cover the first surface 111. The first accommodating cavity a1 is defined and formed between the first sealing piece 2 and the circuit board 11. The sensing component 12 is received in the first accommodating cavity a1. The first sealing piece 2 includes a first waterproof air-permeable portion p1. The second sealing piece 3 is disposed to cover the second surface 112. Hence, liquid such as water or tobacco liquid, etc., is prevented and blocked outside the airflow sensor 100 by the first waterproof air-permeable portion p1 and the second waterproof air-permeable portion p2. Liquid such as water or tobacco liquid, etc., inside and outside the electronic cigarette 1000 cannot completely flow into the airflow sensor 100. As a result, a using life of the electronic cigarette 1000 is elongated. Secondly, since the first sealing piece 2 and the second sealing piece 3 are respectively disposed to cover corresponding locations of the first surface 111 and the second surface 112, the airflow sensor 100 and the electronic cigarette 1000 in accordance with the present invention is convenient for manufacture, and have better hermeticity. Finally, since the connecting soldering pad [115] 114 electrically connected with the sensing component 12 is disposed at the circuit board 11, the airflow sensor 100 is electrically connected with other circuitry components through the connecting soldering pad 114. The connecting soldering pad 114 is not covered by either the first sealing piece 2 or the second sealing piece 3. Hence, a problem of bad hermeticity caused by opening holes on the first sealing piece 2 or the second sealing piece 3 can be avoided.

The above preferred embodiments in accordance with the present invention are only partial preferred embodiments which are exemplified in the present specification of the present invention for being convenient for understanding of the content of the present invention. They are not used to limit technical solutions in accordance with the present invention in any way, and are not complete feasible solutions in accordance with the present invention. Hence, any minor modifications or equivalent substitutions made on structures, processes or steps in accordance with the present invention should be all covered by the protective scope of the present invention.

What is claimed is:

1. An airflow sensor, comprising a sensing circuit module, a first sealing piece and a second sealing piece, wherein the sensing circuit module comprises a circuit board and a sensing component disposed on the circuit board, the circuit board comprises a first surface and a second surface disposed at two opposite sides of the circuit board, the first sealing piece is disposed to cover at least a part of the first surface, the second sealing piece is disposed to cover at least a part of the second surface, a first accommodating cavity is defined and formed between the first sealing piece and the circuit board, the sensing component is received in the first accommodating cavity, the first sealing piece comprises a first waterproof air-permeable portion, the first waterproof air-permeable portion is used to form airflow communication between the first accommodating cavity and an outside of the airflow sensor, and to prevent liquid outside the airflow sensor from entering the first accommodating cavity, a connecting soldering pad electrically connected with the sensing component is disposed at the circuit board, the airflow sensor is electrically connected with other circuitry components through the connecting soldering pad, the connecting soldering pad is not covered by either the first sealing piece or the second sealing piece.

2. The airflow sensor as claimed in claim 1, wherein an air vent is opened and disposed at the circuit board to penetrate through the circuit board from the first surface to the second surface, the second sealing piece is disposed to cover the air vent, and the second sealing piece comprises a second waterproof air-permeable portion, the second waterproof air-permeable portion is used to form airflow communication between the air vent and the outside of the airflow sensor, and to prevent liquid outside the airflow sensor from entering the air vent.

3. The airflow sensor as claimed in claim 1, wherein the connecting soldering pad is disposed at the first surface.

4. The airflow sensor as claimed in claim 1, wherein a connecting circuit is disposed inside the circuit board, the sensing component is electrically connected with the connecting soldering pad through the connecting circuit.

5. The airflow sensor as claimed in claim 1, wherein the first sealing piece comprises a first cover body and a first waterproof air-permeable membrane, the first cover body is disposed to cover the first surface, the first accommodating cavity is defined and formed between the first cover body and the circuit board, an air outlet is disposed at the first cover body, the first waterproof air-permeable membrane is connected with the first cover body and covers the air outlet, the first waterproof air-permeable portion is formed by a part of the first waterproof air-permeable membrane covering the air outlet.

6. The airflow sensor as claimed in claim 5, wherein a first sealing pad is disposed at the first surface, the first cover body is soldered and connected on the first sealing pad.

7. The airflow sensor as claimed in claim 2, wherein the sensing component comprises a signal processing chip, a slip ring and a sensing capacitor all of which are disposed in the first accommodating cavity, the sensing capacitor comprises an electric conductive film and an electrode plate, an end of the slip ring is fixed on the circuit board and is electrically connected with the signal processing chip, the electric conductive film is disposed to cover an end face of another end of the slip ring, the slip ring and the electric conductive film are formed as an air blocking and isolating cover, a vent exit of the air vent located on the first surface is covered by the air blocking and isolating cover, the electrode plate and the electric conductive film are disposed to be spaced from each other, and the electrode plate is electrically connected with the signal processing chip.

8. The airflow sensor as claimed in claim 7, wherein an outer circumferential face of the electrode plate and an inner wall face of the first cover body are interference fit, and the electrode plate is electrically connected with the signal processing chip through the first cover body.

9. The airflow sensor as claimed in claim 2, wherein the second sealing piece comprises a second cover body and a second waterproof air-permeable membrane, the second cover body is disposed to cover the second surface, a second accommodating cavity is defined and formed between the second cover body and the circuit board, an air inlet is disposed at the second cover body, the second waterproof air-permeable membrane is connected with the second cover body, and covers the air inlet, the second waterproof air-permeable portion is formed by a portion of the second waterproof air-permeable membrane covering the air inlet.

10. The airflow sensor as claimed in claim 9, wherein a second sealing pad is disposed at the second surface, the second cover body is soldered and connected with the second sealing pad.

11. The airflow sensor as claimed in claim 10, wherein the second sealing pad is ring shaped, the second cover body comprises a cylindrical lateral wall and a ring-shaped end wall, the lateral wall comprises a first end and a second end opposite disposed on the lateral wall, an end face of the first end of the lateral wall is soldered and connected with the second sealing pad, an end face of the second end of the lateral wall is connected with the end wall, the end wall and the lateral wall are an integrally formed structure, the air inlet is formed at a middle of the end wall, a first adhering layer is disposed between the end wall and the second waterproof air-permeable membrane to surround the air inlet, the second waterproof air-permeable membrane is adhered and connected with the second cover body through the first adhering layer.

12. The airflow sensor as claimed in claim 1, wherein the second sealing piece is a plate structure, and the second sealing piece is adhered and connected with the circuit board.

13. An electronic cigarette, comprising an airflow sensor, wherein the airflow sensor is the airflow sensor as claimed in claim 1.

14. The airflow sensor as claimed in claim 2, wherein the second sealing piece is a plate structure, and the second sealing piece is adhered and connected with the circuit board.

* * * * *